United States Patent
Nakhamkin et al.

[11] Patent Number: 6,038,849
[45] Date of Patent: Mar. 21, 2000

[54] METHOD OF OPERATING A COMBUSTION TURBINE POWER PLANT USING SUPPLEMENTAL COMPRESSED AIR

[75] Inventors: Michael Nakhamkin, 40 Woodman La., Basking Ridge, N.J. 07920; Boris Potashnik, Fanwood, N.J.

[73] Assignee: Michael Nakhamkin, Basking Ridge, N.J.

[21] Appl. No.: 09/281,776

[22] Filed: Mar. 31, 1999

Related U.S. Application Data

[63] Continuation-in-part of application No. 09/110,672, Jul. 7, 1998, Pat. No. 5,934,063.

[51] Int. Cl.[7] ............................. F02C 3/30; F02C 7/00
[52] U.S. Cl. ............................. 60/39.05; 60/726
[58] Field of Search ............................. 60/39.02, 39.05, 60/39.53, 39.59, 726, 728

[56] References Cited

U.S. PATENT DOCUMENTS

| | | |
|---|---|---|
| 4,441,028 | 4/1984 | Lundberg . |
| 5,363,642 | 11/1994 | Frutschi et al. . |
| 5,379,589 | 1/1995 | Cohn et al. . |
| 5,495,709 | 3/1996 | Frutschi . |
| 5,778,675 | 7/1998 | Nakhamkin .......................... 60/39.05 |
| 5,906,094 | 5/1999 | Yang et al. .......................... 60/39.05 |

*Primary Examiner*—Louis J. Casaregola
*Attorney, Agent, or Firm*—Fakas & Manelli Stemberger, E.J.

[57] ABSTRACT

A method is provided to ensure that a combustion turbine power generation system may operate at maximum allowable power at elevated ambient temperature and/or at low air density. The method includes providing at least one combustion turbine assembly including a compressor, an expansion turbine operatively associated with the compressor, a generator coupled with the expansion turbine; a combustor feeding the expansion turbine; flow path structure fluidly connecting an outlet of the compressor to an inlet of the combustor.

12 Claims, 9 Drawing Sheets

METHOD OF OPERATING A COMBUSTION TURBINE POWER PLANT USING SUPPLEMENTAL COMPRESSED AIR

This is A Continuation-in-Part of U.S. patent application Ser. No. 09/110,672 filed on Jul. 7, 1998. now U.S. Pat. No. 5,934,063.

This invention relates to combustion turbine power plant and more particularly, to method of operating a combustion turbine power plant so as to restore a loss of power which may occur when the combustion turbine assembly is operating at high ambient temperature or with low air density and/or to generate power which exceeds a power production of a conventional combustion turbine assembly by use of supplementary air flow.

BACKGROUND OF THE INVENTION

A combustion turbine power plant is the power plant of choice for supplying peak power. For an overwhelming majority of electric power customers (in the U.S. and abroad) power consumption reaches its peak during the summertime, the time when the power production of combustion turbines is at its lowest, due to high ambient temperature. The simplified explanation of the reduced power production is that the high ambient temperature with associated lower inlet air density, reduces mass flow through a combustion turbine assembly with a respective reduction of the power produced. FIGS. 1a, 1b, and 1c present simplified heat and mass balances of a conventional General Electric Frame 7 EA combustion turbine assembly 12 operating at three ambient temperatures: 59 F. (FIG. 1a), 0 F. (FIG. 1b) 90 F. (FIG. 1c). The combustion turbine 12 includes a compressor 14, an expansion turbine 16, a combustor 18 which feeds heated combustion product gas to the expansion turbine 16. The expansion turbine 16 is coupled to drive the compressor 14 and an electric generator 20, which is coupled to the electric grid 17.

FIGS. 1a–1c demonstrate that the conventional General Electric combustion turbine assembly, rated at 84.5 MW at ISO conditions (59 F. with 60% relative humidity), will produce maximum power of approximately 102. 5 MW when the ambient temperature is 0 F., and will drop power to approximately 76.4 MW at 90 F. The significant power loss by a combustion turbine assembly during high ambient temperature periods requires a utility to purchase additional peak capacities to meet summer peak demands. Power loses for a combined cycle power plant operating at high ambient temperatures are similar to those of combustion turbine assemblies.

There are conventional methods to partially restore the loss power of combustion turbines/combined cycle plants during high ambient temperature periods: evaporative cooling and various combustion turbine inlet air chillers (mechanical or absorption type). These methods result only in partial restoration of combustion turbine power while significantly increasing capital costs, which is not always justified for an operation limited to time periods with high ambient temperatures.

Accordingly, there is a need to develop a method which will allow a combustion turbine assembly to operate at maximum power, regardless of ambient temperature.

Similar power loss problems exist in the case of a combustion turbine assembly installed at high elevation. The problem in these applications is associated with lower air density and a corresponding loss of consumption turbine power. There are currently no methods to restore power loss associated with high elevation applications.

Accordingly, a need exists to develop a method which will allow a combustion turbine assembly to maintain maximum power even when operating at high elevations.

SUMMARY OF THE INVENTION

An object of the invention is to fulfill the needs referred to above. In accordance with the principles of the present invention, these objectives are obtained by a method of ensuring that a combustion turbine power generation system may operate at maximum allowable power at elevated ambient temperature and/or at low air density and/or operate at a power which exceeds that of a conventional combustion turbine assembly by providing complimentary air from an air storage. The method includes providing at least one combustion turbine assembly including a compressor, an expansion turbine operatively associated with the compressor, a generator coupled with the expansion turbine; a combustor feeding the expansion turbine; flow path structure fluidly connecting an outlet of the compressor to an inlet of the combustor; a compressed air storage; a charging compressor for charging the air storage; charging structure fluidly connecting and outlet of the charging compressor with an inlet to the air storage; connection structure fluidly connecting an outlet of the air storage to an inlet of the combustor; and valve structure associated with the connection structure and the charging structure to control flow through the connection structure and the charging structure, respectively.

The valve structure is controlled to selectively permit one of the following modes of operation: (1) a combustion turbine mode of operation wherein air compressed from the compressor moves through the flow path structure to the combustor feeding the expansion turbine such that the expansion turbine drives the generator, (2) a compressed air augmentation mode of operation wherein compressed air from the air storage is supplied through the connection structure to the combustor in addition to the compressed air passing through the flow path structure to the combustor, which increases mass flow of compressed air and gas to the expansion turbine and thus permits the generator to provide an increased power due to the additional compressed air being suppled to the expansion turbine, and (3) an air storage charging mode of operation wherein compressed air from the charging compressor moves through the charging structure to charge the air storage.

In accordance with an aspect of the invention, compressed air from the air storage is directed to a saturator where the compressed air is mixed with hot water. The saturated and preheated compressed air is sent to a recuperator for further heating before being injected upstream of the combustor.

In accordance with another aspect of the invention, the compressed air storage is eliminated and a supplemental compressor structure is sized for full supplemental air flow to the combustor so as to continuously operate and produce incremental power without being limited by the size of an air storage.

The above and other objects of the present invention will become apparent during the course of the following detailed description and appended claims.

The invention may be best understood with reference to the accompanying drawings wherein illustrative embodiments are shown, and like parts are given like reference numerals.

DETAILED DESCRIPTION OF THE INVENTION

Figure 2:
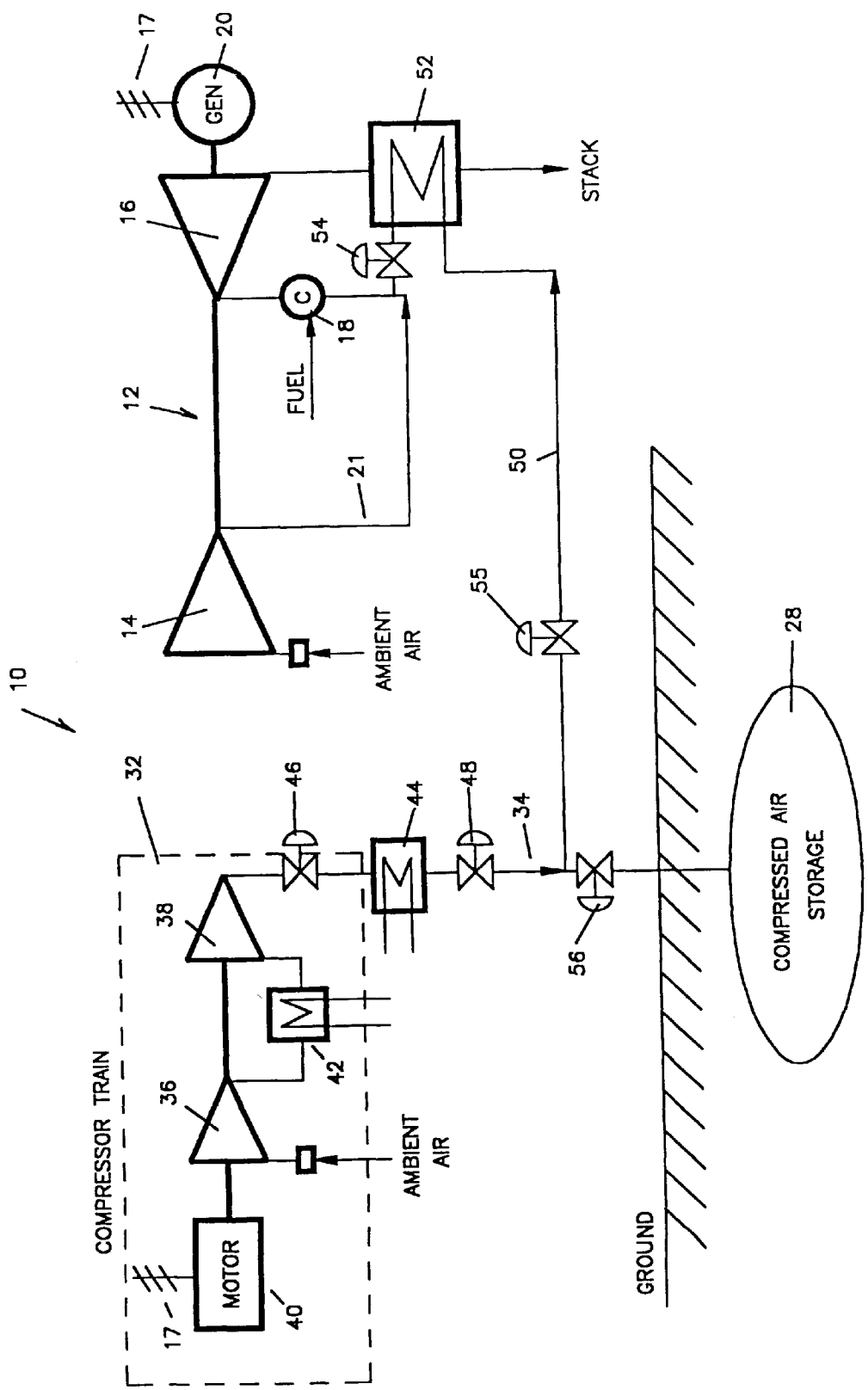
FIG. 2. is an embodiment of a combustion turbine power generation system provided in accordance with the principles of the present invention.

With reference to FIG. 2, a combustion turbine power generating system provided in accordance with the principles of the present invention is shown, generally indicated at 10. It will be appreciated that the physics and mechanics of the inventive system 10 are identical for operation at high ambient temperature and at high elevations. Therefore, all explanations herein will describe the method and its effectiveness for the high ambient temperature application only. Further, it is to be understood that the invention applies equally to a combined cycle plant, where a combustion turbine is a main component.

Referring to FIG. 2, one embodiment of a combustion turbine power generation system 10 is schematically illustrated and includes a conventional combustion turbine assembly 12 which may be, for example, a GE 7 EA combustion turbine assembly. The combustion turbine assembly 12 includes a shaft assembly having a compressor 14, an expansion turbine 16, and a combustor 18 which feeds heated combustion product gas to the expansion turbine 16. The expansion turbine 16 is coupled to drive the compressor 14 and is coupled with an electric generator 20. The generator 20 is coupled to an electric grid 17. In a combustion turbine mode of operation, air is compressed in the compressor 14 and via a flow path structure 21, the compressed air is sent to the combustor 18, and thereafter heated combustion product gas is expanded in the expansion turbine 16 to produce power.

In accordance with the invention, the combustion turbine assembly 12 is provided so as to inject previously stored compressed air to an inlet of the combustor 18 feeding the expansion turbine 16. If power is to be provided which exceeds power generated by the combustion turbine assembly 12, a capacity of the generator may be upgraded, the function of which will be explained more fully below.

An additional compressed air compression storage and retrieval system (CACSRS) is provided and, in the embodiment illustrated in FIG. 2, includes a compressor train 32 to supply compressed air to a compressed air storage 28 via charging structure 34 in the form of piping. In the illustrated embodiment, the compressor train 32 includes first and second compressors 36 and 38, respectively, driven by an electric motor 40. An intercooler 42 may be provided between the first compressor 36 an the second compressor 38. In addition, an aftercooler 44 may be provided between outlet of the second compressor 38 and an inlet to the compressed air storage 28. A valve 46 is provided between the outlet of the second compressor 38 and an inlet to the aftercooler 44. A valve 48 is provided between an outlet of the aftercooler and an inlet to the compressed air storage 28. Valves 46 and 48 define a first valve system.

An outlet of the compressed air storage 28 is fluidly coupled to an inlet of the combustor 18 via connection structure 50. In the illustrated embodiment, a recuperator 52 is provided between an outlet of the air storage 28 and an inlet to the combustor 18. A valve 54 is provided between an outlet of the recuperator 52 and an inlet of the combustor 18 and a valve 55 is provided in the connection structure 50 between the outlet of the air storage 28 and the inlet to the recuperator 52. Valves 54 and 55 define a second valve system. In addition, an optional valve 56 is provided downstream of a juncture between the charging structure 34 and the connection structure 50 leading to the air storage 28. It can be appreciated that if the recuperator 52 is not provided, then valve 54 is not necessary. Similarly, if the aftercooler 44 is not provided, valve 46 is not necessary.

The electric motor 40 is coupled to the electric grid 17 such that during off-peak hours, the electric motor 40 may drive the compressor train 32 to charge the air storage 28.

The compressed air storage may be a underground geological formation such as a salt dome, a salt deposition, an aquifier, or may be made from hard rock. Alternatively, the air storage 28 may be a man-made pressure vessel which can be provided above-ground.

The method of the present invention includes an integration of the combustion turbine assembly 12 and the additional compressed air charging storage and retrieval system to provide for three modes of operation:

(1) a compressed air storage system charging mode of operation, with a flow path going through the compressor train 32, aftercooler 44, charging structure 34 to the compressed air storage 28; wherein valves 46 and 48 in the charging structure 34 are open and valves 54 and 55 in connection structure 50 are closed; and the motor-driven compressor train 32, using off-peak energy from the grid 17, compresses the ambient air to the specified pressure in the air storage 28.

(2) an air augmentation mode of operation, wherein the conventional combustion turbine assembly 12 operation is integrated with the compressed air flow from the air storage 28; air from the air storage 28 is preheated in the recuperator 52 and is injected upstream of the combustors 18; and wherein the compressed air from the air storage 28 goes through the connection structure 50, through the recuperator 52 to a point upstream of the combustor 18; during this operation valves 46 and 48 in the charging structure 34 are closed and valves 54 and 55 in the connection structure 50 are open and control the additional flow from the air storage 28; this mode of operation results in power production significantly exceeding that of the combustion turbine assembly 12 because the power produced by the expansion turbine 16 results from the expansion of the total flow, which is a sum of the flow compressed by the compressor 14 and an additional flow from the compressed air storage 28; inlet guide vanes of compressor 14 may be closed to reduce power consumption by the compressor 14 to increase the electric power by the electric generator 20 to the electric grid 17; and (3) a conventional combustion turbine mode of operation, where CACSRS is disconnected from the combustion turbine assembly 12, and valves 46 and 48 in the charging structure 34 and valves 54 and 55 in the connection structure 50 are closed, permitting compressed air to move from the compressor 14 through the flow path structure 21 to the combustor 18 feeding the expansion turbine 16.

Although only one combustion turbine assembly 12 is shown in the embodiments herein, it can be appreciated that numerous combustion turbine assemblies may be provided and coupled with a common air storage to provide the desired augmented air flow and thus, the desired power output.

Figure 3:
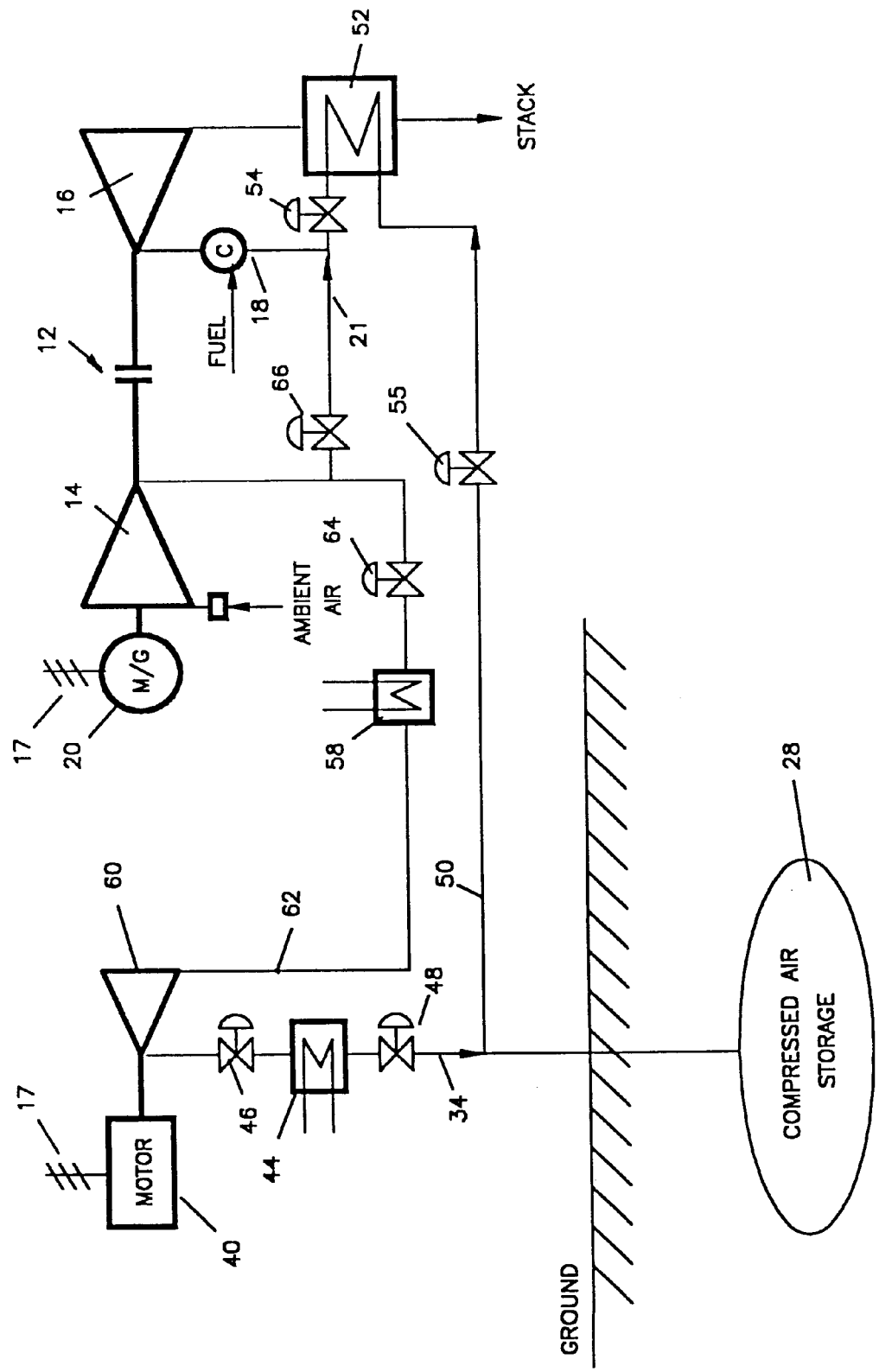
FIG. 3 is another embodiment of a combustion turbine power generation system of the invention.

FIG. 3 is a schematic illustration of a second embodiment of the invention and includes the combustion turbine assembly 12. As above, there is a provision to inject previously stored compressed air upstream of combustor 18 and a provision to extract the compressed air downstream of the compressor 14 for a further intercooling in an intercooler 58 and compression in a boost compressor 60. Also, the capacity of the electric generator 20 may be upgraded, if required.

The method also provides a CACSRS having an electric motor 40 driving the charging boost compressor 60 fed by the intercooler 58. An aftercooler 44 is provided downstream of the boost compressor 60 and valves 46 and 48 are provided before and after the aftercooler, respectively, and are disposed in the charging structure 34. Thus, a flow path is provided from an outlet of the compressor 14 through the intercooler 58, disposed in integrating structure 62, to an inlet of the boost compressor 60, through the aftercooler 44 to the compressed air storage 28. In addition, compressed air may flow from an outlet of the compressor 14 to an inlet of the combustor 18 via the flow path structure 21. The compressed air storage fluidly communicates via connection structure 50 to a point upstream of combustor 18. Valve 64 in the integrating structure 62, together with valve 66 in the flow path structure 21, valves 44 and 46 in the charging structure 34, and valves 54 and 55 in the connection structure 50, selectively control flow through the flow path structure 21, the connection structure 50, the charging structure 34 and the integrating structure 62.

As in the first embodiment, the combustion turbine assembly 12 and the CACSRS are integrated to provide three modes of operation:

(1) a compressed air storage system charging mode of operation, wherein a flow path exists from the compressor 14, through the integrating structure 62 containing the intercooler 58, to the boost compressor 60, through the charging structure 34 containing the aftercooler 44, to the compressed air storage 28; a expansion turbine cooling flow of approximately 5–10% of the nominal flow is flowing from the compressed air storage 28 via the connection structure 50, to the recuperator 52 and to the expansion turbine 16 via unfired combustor 18 and to the exhaust stack; valves 46 and 48 in the charging structure 34 are open, valves 54 and 55 in the connection structure 50 are partially open to provide the cooling flow via unfired combustor 18 to the expansion turbine 16; valve 64 in integrating structure 62 is open and valve 66 is closed; the combustion turbine electric generator 20, fed by off-peak power from the grid 17, drives the combustion turbine shaft and the boost compressor 60 is driven by the electric motor 40, also fed by off-peak energy from the grid 17;

(2) an air augmentation mode of operation, wherein a conventional combustion turbine operation is integrated with the additional compressed air flow from the air storage 28, which is preheated in the recuperator 52 and injected upstream of the combustor 18; thus, the compressed air from the air storage 28 goes through the connection structure 50, through the recuperator 52 to a point upstream of the combustor 18; valves 46 and 48 in the charging structure 34 are closed, valves 55 and 54 in the connection structure 50 are open and control the additional flow from the air storage 28; valve 64 in the integrating structure 62 is closed and the valve 66 is open; this mode of operation results in power production significantly exceeding that of the combustion turbine assembly 12, because the power produced by the expansion turbine 16 results from the expansion of the total flow, which is a sum of the flow compressed by the compressor 14 and an additional flow from the compressed air storage 28; inlet guide vanes of compressor 14 may be closed to reduce power consumption by the compressor 14 to increase the electric power by the electric generator 20 to the electric grid 17;

(3) a conventional combustion turbine mode of operation, wherein the CACSRS is disconnected from the combustion turbine assembly 12, and valves 46 and 48 in the charging structure 34 and valves 55 and 54 in the connection structure 50 are closed and the valve 64 in the integrating structure 62 is closed while valve 66 in the flow path structure is open permitting compressed air to move from the compressor 14 through the flow path structure to the combustor 18 feeding the expansion turbine 16.

Figure 4:
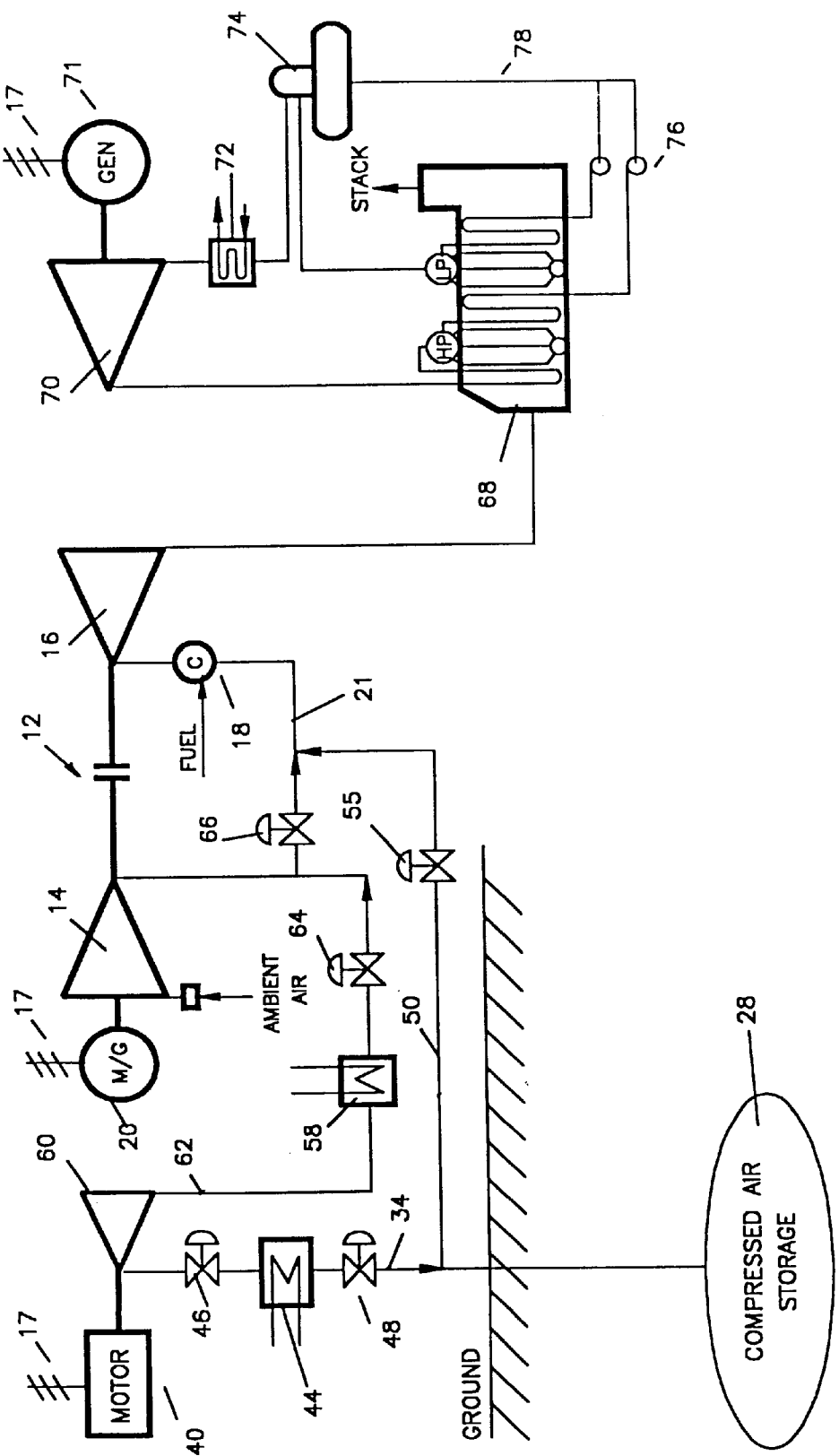
FIG. 4 is yet another embodiment of a combustion turbine power generation system of the invention having a bottom steam cycle.

FIG. 4 is a schematic illustration of a third embodiment of the invention and includes a combined cycle plant with a combustion turbine assembly 12 with a conventional bottoming steam cycle components: a heat recovery steam generator 68, a steam turbine 70, a generator 71 coupled with the turbine 70, a condenser 72, a deaerator 74 and pumps 76. The combustion turbine assembly requires a provision to inject previously stored compressed air upstream of combustor 18 and a provision to extract the compressed air downstream of the compressor 14 for a further intercooling and compression in the boost compressor 60. Also, the capacity of the electric generator 20 may be upgraded if required.

The invented method also provides an additional CACSRS including an electric motor driven a boost compressor 60 fed by intercooler 58, the aftercooler 44, integrating structure 62 permitting communication between an outlet of the compressor 16 via the intercooler 58 to the boost compressor inlet and through the flow path structure 21 to the combustor 18 inlet. Charging structure 34 permits communication between an outlet of the boost compressor 60 and an inlet to the compressed air storage 28. Connection structure 50 permits communication between the compressed air storage 28 and a point upstream of combustor 18. Valves 46 and 48 are provided in the charging structure 34, valve 55 is provided in the connection structure 50, and valve 64 is provided in the integrating structure 62, while valve 66 is provided in the flow path structure 21, to selectively control flow through the charging structure 34, the connection structure 50 and the integrating structure 62 and the flow path structure 21.

The combustion turbine assembly 12 is integrated with a steam bottoming cycle, generally indicated at 78, and the additional CACSRS to provide for three modes of operation:

(1) a compressed air storage charging mode of operation, wherein flow goes through the compressor 14, through the integrating structure 62 having the intercooler 58, to the boost compressor 60, through the charging structure 34 having the aftercooler 44 to the compressed air storage 28; a turbine cooling flow, which is approximately 5–10% of the nominal flow is flowing from the compressed air storage 28 through the connection structure 50, and via an unfired combustor 18, to the expansion turbine 16 and then to the exhaust stack; valves 46 and 48 in the charging structure 34 are open, valve 55 in the connection structure 50 is partially open to provide the cooling flow via the unfired combustor 18 to the expansion turbine; and valve 64 in the integrating structure 62 is open and valve 66 is closed; the combustion turbine electric generator 20, fed by off-peak power from the grid 17, drives the combustion turbine shaft and the boost compressor 60 is driven by the electric motor 40, also fed by off-peak energy from the grid 17;

(2) an air augmentation mode of operation, where a conventional combustion turbine operation is integrated with additional compressed air flow from the air storage 28, which is injected upstream of the combustor 18; where compressed air from the air storage 28 goes through the connection structure 50 to a point upstream of the combustor 18; valves 46 and 48 in the charging structure 34 are closed, valve 55 in the connection structure 50 is open and controlling the additional flow from the air storage 28; valve 64 in the integrating structure 62 is closed and valve 66 is open; in addition, a conventional closed-loop steam/condensate flow path is provided where steam generated in the heat recovery steam generator 68 expands through the steam turbine 70 producing power to the grid 17, and then goes through the condenser 72, deaerator 74, feedwater pumps 76 and back to the heat recovery steam generator 68; this mode of operation results in power production by the combustion turbine assembly 12 significantly exceeding that of the conventional combustion turbine assembly without the additional air flow, because the power produced by the expansion turbine 16 results from the expansion of the total flow, which is a sum of the flow compressed by the compressor 14 and an additional flow from the compressed air storage 28; also, an additional power is produced by the steam turbine of the bottoming cycle 78 due to additional steam flow by the heat recovery steam generator 68 recovering heat from the expansion turbine 16 exhaust; inlet guide vanes of compressor 14 may be closed to reduce power consumption by the compressor 14 to increase the electric power by the electric generator 20 to the electric grid 17; and (3) a conventional combustion turbine mode of operation, wherein CACSRS is disconnected from the combustion turbine assembly 12, and valves 46 and 48 in the charging structure 34, valves 55 and 54 in the connection structure 50 are closed and the valve 66 in the flow path structure 21 is open permitting compressed air to move from the compressor 14 through the flow path structure to the combustor 18 feeding the expansion turbine 16.

Figure 1A:
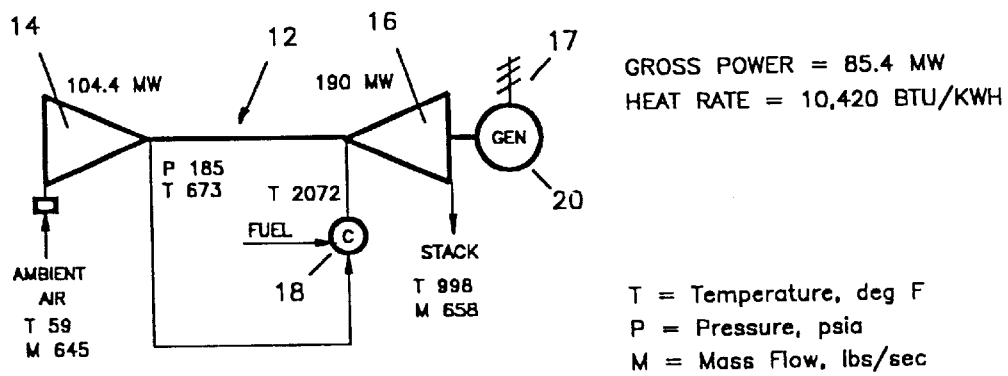
FIG. 1a is a schematic diagram of a conventional GE 7 EA combustion turbine operating at 59 F.
Figure 1B:
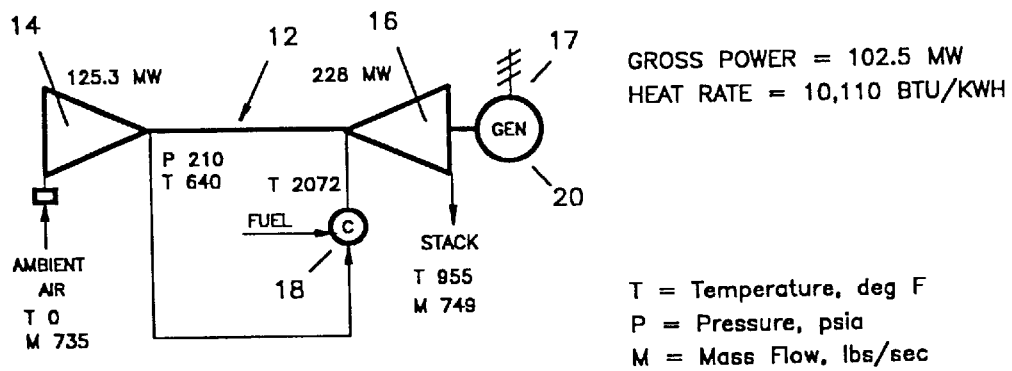
FIG. 1b is a schematic diagram of a conventional GE 7 EA combustion turbine operating at 0 F.
Figure 1C:
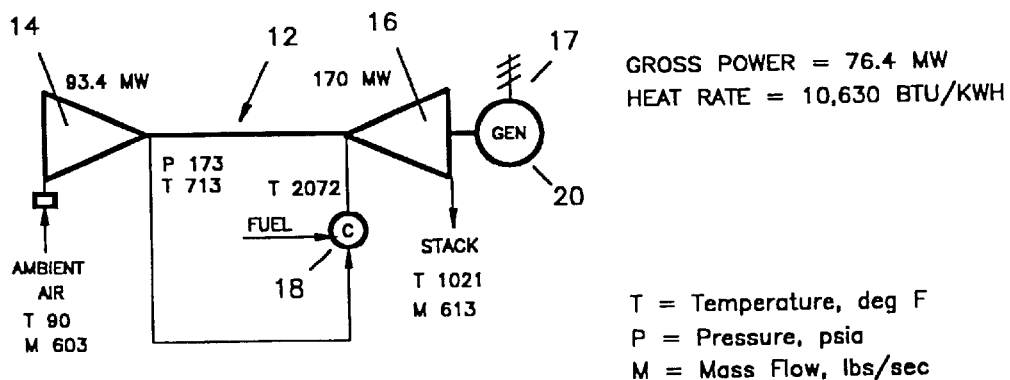
FIG. 1c is a schematic diagram of a conventional GE 7 EA combustion turbine operating at 90 F.
Figure 5:
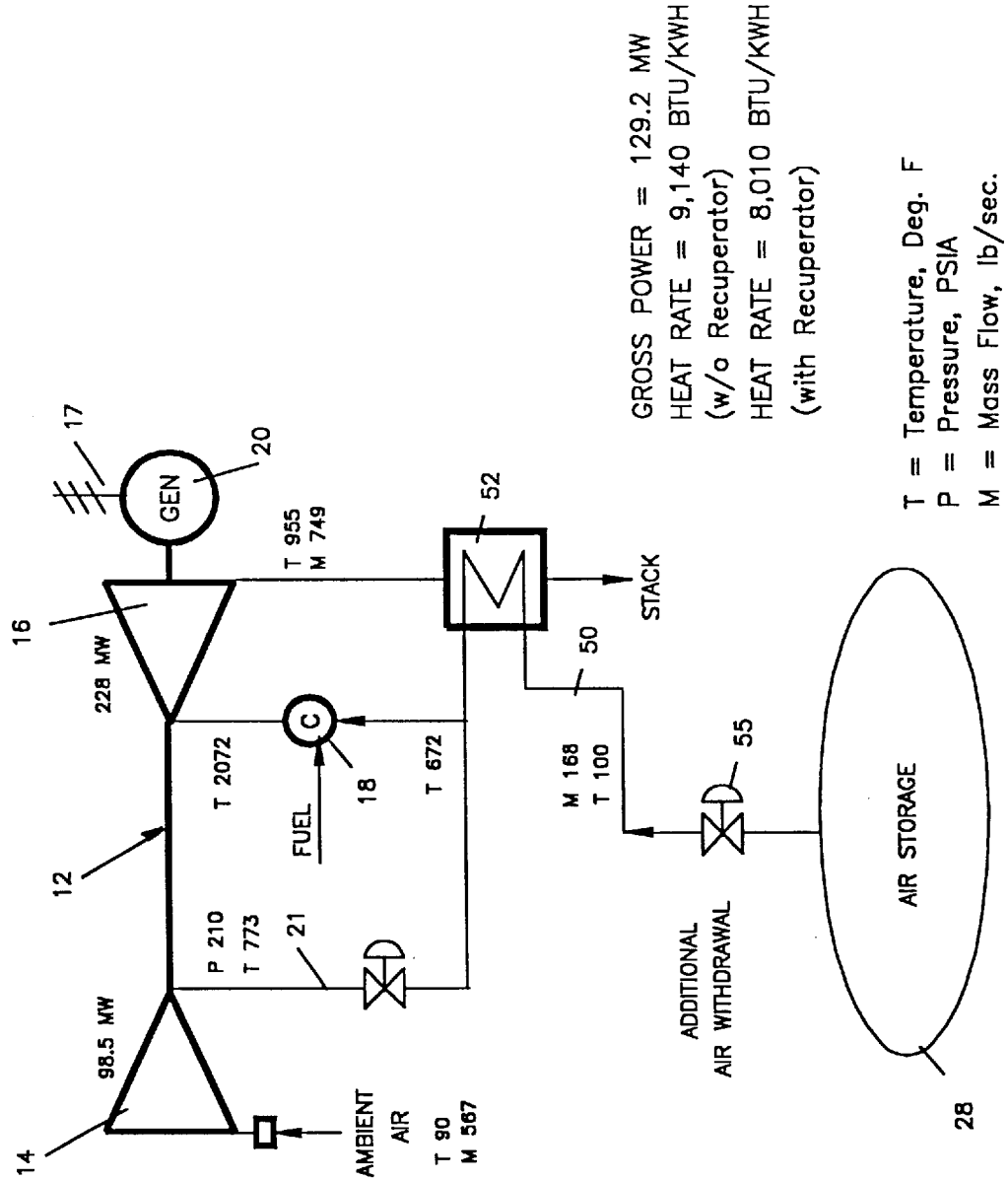
FIG. 5 is a schematic diagram of operating parameters applicable to the embodiments illustrated in FIGS. 2 and 3 wherein a combustion turbine assembly operates in an air augmentation mode of operation at 90 F. ambient temperature.

Practical applications of the inventive method are illustrated in FIG. 5, which is a schematic diagram with operating parameters applicable to the first and the second illustrative embodiments according to the present invention, where a GE Frame 7EA combustion turbine assembly 12 operates in an air augmentation mode and at 90 F. ambient temperature. FIG. 5 illustrates that during air augmentation at an elevated ambient temperature of 90 F., the additional compressed air flow of 168 lbs/sec is retrieved from the compressed air storage 28 and injected upstream of the combustor 18 to increase the combustion turbine power output to 129.2 MW from 76.4 MW for the conventional combustion turbine assembly operation at the same 90 F. ambient temperature (see FIG. 1c). The amount of the retrieved air is limited by a number of design limitations. For a GE Frame 7 EA combustion turbine assembly, the limitation is the maximum expansion turbine power of 228 MW and is achieved when the combustion turbine assembly operates at 0 F. (see FIG. 1b).

Table 1a presents performance characteristics of the GE Frame 7 EA operating as a conventional combustion turbine assembly with air augmentation—applicable to the first and the second illustrative embodiments of the invention. Table 1a indicates that over the whole range of ambient temperatures higher than 0 F., air augmentation results in power increased by 52.8 MW for 90 F. ambient temperature and 32.8 MW for 59 F. Performance parameters for the air augmentation concept are heat rate characterizing the fuel consumption in BTU per kWh produced and an kWh consumption for the compressed air storage recharging. The cost of electricity (COE) produced is calculated as: COE= (Heat rate, BTU/kWh)×(cost of fuel, $/BTU)+(the off-peak energy for the air storage recharging, kWh)×(cost of off-peak energy, $/kWh)/total kWh produced in the air augmentation mode of operation.

TABLE 1a

| | Ambient Temperature | | | |
|---|---|---|---|---|
| | 0 | 59 | 70 | 90 |
| Frame 7EA CT - Simple Cycle | | | | |
| Gross Power, MW | 102.5 | 85.4 | 82.4 | 76.4 |
| Heat Rate (LHV & Natural Gas Fuel), Btu/kWh | 10,110 | 10,420 | 10,520 | 10,630 |
| Augmentation based on Frame 7EA | | | | |
| Gross Power Output, MW | 102.5 | 118.0 | 122.2 | 129.2 |
| Incremental Gross Power, MW | 0.0 | 32.6 | 39.8 | 52.8 |
| Heat Rate (LHV & Nat. Gas Fuel), btu/kWh w/o recup. | 10,110 | 9,610 | 9,510 | 9,140 |
| Heat Rate with recuperator | N/A | 8,680 | 8,340 | 8,010 |
| Time of Augmentation Operation, Hours | N/A | 9.8 | 8.5 | 6.0 |
| Compression and Storage | | | | |
| Compression Energy, MH | | 210 | | |
| Storage Type | | Salt Dome | | |
| Volume, Million Cu. Ft. | | 5.385 | | |
| Delta P in Cavern, psi | | 150 | | |

Table 1b demonstrates performance characteristics of the third illustrative embodiment of the invention, i.e., the conventional combined cycle plant, based on GE Frame 7EA, and the plant operation in an air augmentation mode. The findings are similar to the first and second illustrative embodiments.

TABLE 1b

|  | Ambient Temperature | | | |
| --- | --- | --- | --- | --- |
|  | 0 | 59 | 70 | 90 |
| Frame 7EA CT - Combined Cycle | | | | |
| Gross Power, MW | 155.6 | 134.1 | 130.7 | 123.4 |
| Heat Rate (LHV & Natural Gas Fuel), btu/kWh | 6,810 | 6,800 | 6,900 | 6,970 |
| Augmentation based on Frame 7EA Combined | | | | |
| Gross Power Output, MW | 155.6 | 168.4 | 172.5 | 178.9 |
| Incremental Gross Power, MW | 0.0 | 34.3 | 41.9 | 55.6 |
| Heat Rate (LHV & Natural Gas Fuel), btu/kWh | 6,810 | 6,730 | 6,740 | 6,600 |
| Time of Augmentation Operation, Hours | N/A | 9.8 | 8.5 | 6.0 |
| Compression and Storage | | | | |
| Compression Energy, Mh | | 210 | | |
| Storage Type | | Salt Dome | | |
| Volume, Million Cu. Ft. | | 5.385 | | |
| Delta P in Cavern, psi | | 150 | | |

The cost of conversion of a combustion turbine system provided with air augmentation are as follows:
- compressed air storage cost;
- compressor train cost for the storage recharging;
- costs of an interconnecting piping, valves and controls for the overall system integration The compressed air storage shall be sized to store a sufficient mass of air to support air augmentation operations with maximum power output for a specified number of hours with elevated ambient temperatures. The stored compressed air pressure should be sufficient to inject the additional mass of air upstream of the combustor. For the embodiment shown in FIG. 5, and Tables 1a and 1b, when the air storage is sized to provide for continuous six (6) hours of operation at 90 F. with maximum power output of 129.2 MW, the properly sized compressed air storage in a salt dome requires 5.4 million cubic feet (with depth of approximately 1000 feet and the maximum minus minimum pressure difference of 150 p.s.i.) at cost of approximately $5 million. Engineering and cost estimates demonstrated that for the above conditions total costs for a providing the GE Frame 7EA combustion turbine assembly to include air augmentation are approximately $8.8 million with 52.8 MW additional power at 90 F. ambient temperature (see Table 1a) or the specific cost of the modification is approximately $160/ kW. This compares favorably with approximately $300/kW specific cost for a similar (50 MW) capacity combustion turbine assembly. A similar modification for a combined cycle plant (see Table 1b) will cost approximately $150/kW, which is even more attractive as compared with approximately $500/ kW for a combined cycle power plant.

Figure 6:
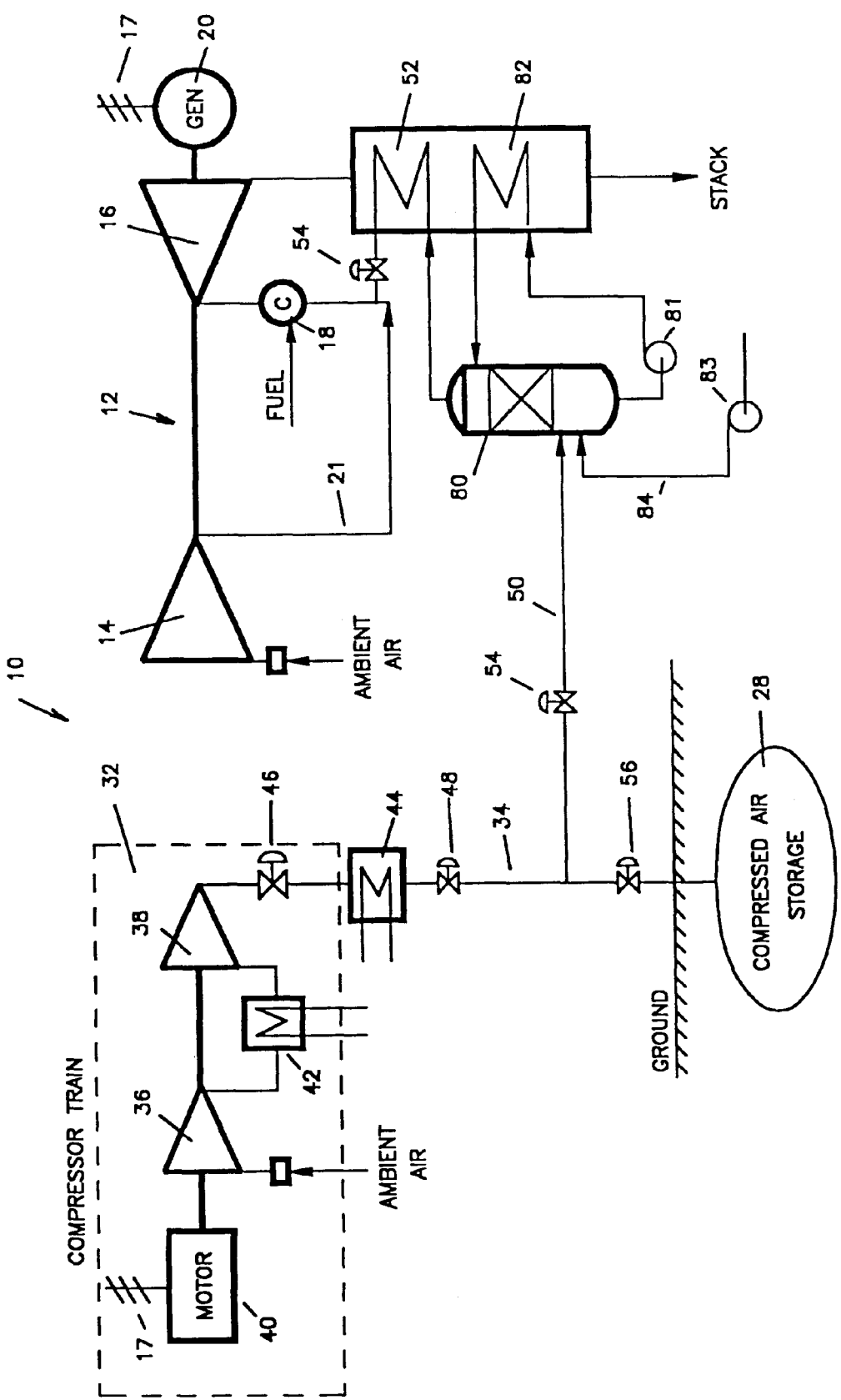
FIG. 6 is another embodiment of a combustion turbine power generation system of the invention including humidification of the supplemental airflow.

In accordance with another aspect of the invention, the embodiment of FIG. 2 has been modified and the modified system is shown in FIG. 6. Like numerals indicate like parts in FIGS. 2 and 6. Thus, the embodiment of FIG. 6 includes a commercially available saturator 80 which defines a tower with internal packing to improve mixing of compressed air entering the saturator 80 via the connection structure 50. A water heater 82 is coupled to the saturator 80 via inlet line 85 and exit line 87. The water heater 82 is preferably a typical shell and tube design. A water pump 83 provides make-up water via piping 84 to the saturator 80 and a water pump 81 is provided in inlet line 85 to circulate water through the water heater 82.

The compressed air from the air storage 28 is directed via the connection structure 50 to the saturator 80 where the compressed air is mixed with hot water heated in the water heater 82. The compressed air is saturated and preheated in the saturator 80 and then is sent to the recuperator 52 for further heating before injection upstream of the combustor 18. For the same maximum power and volumetric flow of turbine 16, the required supplemental compressed airflow is established for given ambient temperature.

Figure 7:
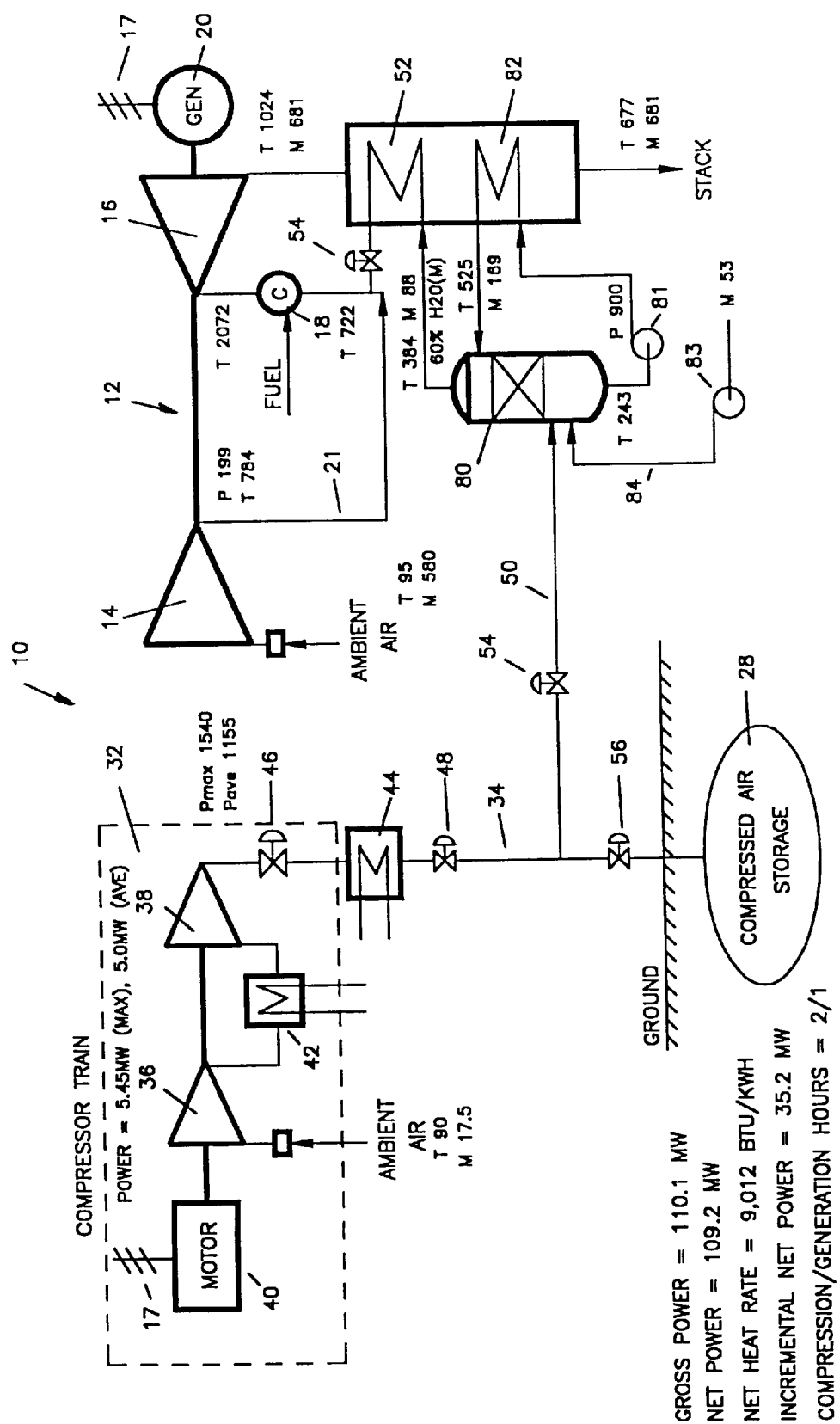
FIG. 7 is a schematic diagram of operating parameters applicable to the embodiment illustrated in FIG. 6 wherein a combustion turbine assembly operates in an air augmentation mode of operation at 90 F. ambient temperature.

With the embodiment of FIG. 6, the humidification of the supplemental airflow significantly reduces the amount of the compressed air to be compressed by the compressor train 32 and stored in the compressed air storage 28. FIG. 7 presents the heat and mass flow balance for the embodiment of FIG. 6 and shows that for 90 F. ambient air temperature and 60% humidity flow leaving the saturator 80, the supplemental compressed airflow exiting the air storage 28 is 35 lbs/sec. For the same net power output this is a reduction, from 100 lbs/sec for the embodiment of FIG. 2 without humidification, of approximately 70%. (note—FIG. 5 shows the heat and mass flow balance for the embodiment of FIG. 2 wherein the gross power was 129.2 MW). Thus, the cost of the compressed air storage is reduced by approximately 70% and the cost of the compressor train 32 and the recuperator 52 can also be significantly reduced. Added costs for the saturator 80, water heater 82 and pumps 81 and 83 are a small fraction of the costs savings associated with the storage volume reduction. FIG. 7 demonstrates the heat rate of 9012 Btu/kWh, which is similar to that of the embodiment of FIG. 5 (which does not provide humidification). Due to the fact that the supplemental airflow of the embodiment of FIG. 7 vs. the embodiment of FIG. 2 is reduced by 70%, in the embodiment of FIG. 7, the energy requirements for the storage recharging are also reduced by 70%. This reduces the cost of electricity (fuel and off-peak energy costs) for the system. Engineering and cost estimation efforts have established that the specific capital cost ($/incremental kW) for the system of FIG. 6 (approximately $170/kW) is reduced by approximately 40% as to compared to the system of FIG. 2.

Figure 8:
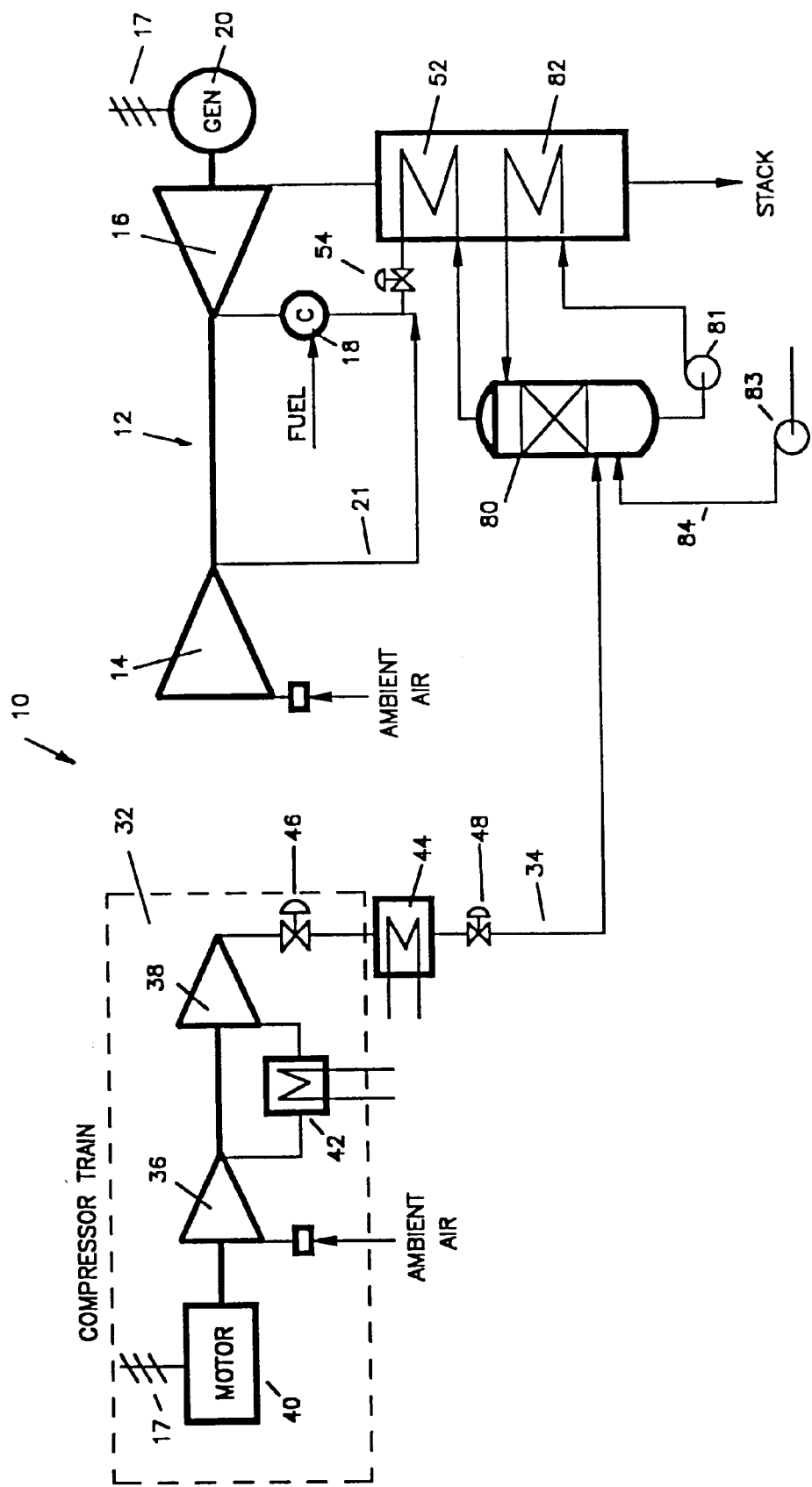
FIG. 8 is another embodiment of a combustion turbine power generation system of the invention which eliminates the compressed air storage but includes humidification of supplemental airflow.

Yet another embodiment of the invention is shown in FIG. 8. This embodiment is similar to that of FIG. 6 and like numbers indicate like parts. The embodiment of FIG. 8 differs from that of FIG. 6 in that in the embodiment of FIG. 8, the compressed air storage is eliminated and supplemental compressor structure in the form of the compressor train 32 is sized to provide full supplemental airflow (e.g., about 35 lbs/sec). It is noted that the compressor train of FIGS. 2 and 6 could be sized for airflow less than the full supplemental airflow and depends on the ratio of peak power production hours and off-peak hours available for charging the air storage.

Figure 9:
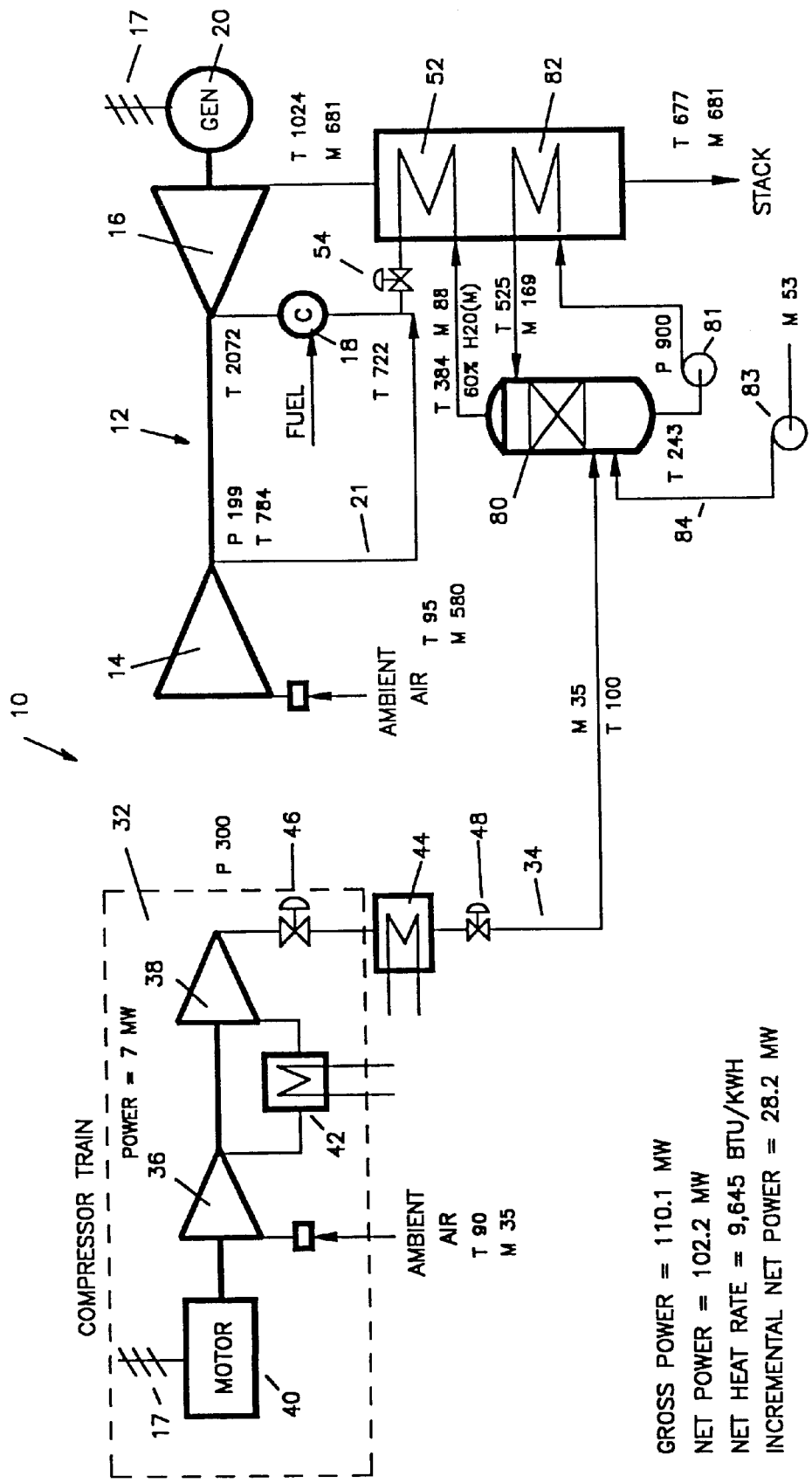
FIG. 9 is a schematic diagram of operating parameters applicable to the embodiment illustrated in FIG. 8 wherein a combustion turbine assembly operates in an air augmentation mode of operation at 90 F. ambient temperature.

The heat and mass balance of the of the system of FIG. 8 is shown in FIG. 9. For the incremental peak power generated, the supplemental airflow is continuously provided by the compressor train 32 with the compressor train discharge flow being saturated in the saturator 80 with the hot water produced in the hot water heater 82. The saturated and preheated air is further heated in the recuperator 52 before being injected upstream of the combustor 18.

The major advantage of the system of FIG. 8 is that it can operate continuously when power is being produced to provide incremental power. There is no limitation imposed by the compressed air storage sizing for particular peak hours. The air storage sizing could be limited by excessive capital costs or siting limitations. Also, the system of FIG. 8 is simple in operation and maintenance.

As shown in FIG. 9, the performance characteristics of the system of FIG. 8 are similar to those shown in FIG. 7. For example, both embodiments have the same operating costs associated with the fuel and off-peak energy. It is expected that the system of FIG. 8 would have lower operating and maintenance costs due to the absence of the air storage. Engineering and costs estimate efforts have shown that the system of FIG. 8 has specific capital costs of approximately the same as those of the system of FIG. 6 (the cost increase for the larger flow compressor train is approximately equal the cost savings from the air storage elimination).

It has thus been seen that the objects of this invention have been fully and effectively accomplished. It will be realized, however, that the foregoing and preferred embodiments have been shown and described for the purposes of illustrating the structural and functional principles of the present invention, as well as illustrating the method of employing the preferred embodiments and are subject to change without departing from such principles. Therefore, this invention includes all modifications encompassed within the spirit of the following claims.

What is claimed is:

1. A method of operating a combustion turbine power generation system and derivatives thereof comprising:

providing at least one combustion turbine assembly including a compressor, an expansion turbine operatively associated with said compressor, a generator coupled with said expansion turbine; a combustor feeding said expansion turbine; flow path structure fluidly connecting an outlet of said compressor to an inlet of said combustor; a supplemental compressor structure; connection structure fluidly connecting an outlet of said supplemental compressor structure to an inlet of a saturator, a water heater to heat water directed to said saturator, a recuperator for receiving preheated and saturated compressed air, an outlet of said recuperator being in communication with said combustor; and valve structure associated with said connection structure to control flow through said connection structure, controlling said valve structure to selectively permit one of the following modes of operation:

a combustion turbine mode of operation wherein air compressed from said compressor moves through said flow path structure to said combustor feeding said expansion turbine such that said expansion turbine drives said generator, and a compressed air augmentation mode of operation wherein supplemental compressed air from said supplemental compressor structure is supplied through said connection structure and is saturated and pre-heated in said saturator and is further heated in said recuperator and then is directed to said combustor, in addition to compressed air passing through said flow path structure to said combustor, which increases mass flow of compressed air and gas to said expansion turbine.

2. The method according to claim 1, wherein said augmentation mode of operation is performed during operating conditions when mass flow of compressed air and gas to said expansion turbine is reduced to a level preventing said expansion turbine from operating at maximum allowable power.

3. The method according to claim 2, wherein said supplemental compressed air is supplied during a time of elevated ambient temperature.

4. The method according to claim 2, wherein said supplemental compressed air is supplied when air density is too low to permit said expansion turbine to operate at maximum allowable power.

5. The method according to claim 2, wherein said supplemental compressor structure comprises a compressor train, and an electric motor drives said compressor train.

6. The method according to claim 5, wherein said compressor train includes at least first and second compressors, an intercooler being provided between an outlet of said first compressor and an inlet to said second compressor, an inlet of said first compressor receiving ambient air, an outlet of said second compressor being coupled with said saturator via said connection structure, an aftercooler being provided in said connection structure between an outlet of said second compressor and an inlet to said saturator.

7. The method according to claim 2, wherein said generator of said combustion turbine system has a capacity to provide power exceeding power generated by said combustion turbine system when operating in said combustion turbine mode of operation, such that during said air augmentation mode of operation, said generator may provide said exceeding power due to the supplemental compressed air being provided to said expansion turbine of said combustion turbine assembly.

8. The method according to claim 1, wherein a first water pump is provided to supply water to said saturator and a second water pump is provided to circulate water between said water heater and said saturator.

9. A method of providing a combustion turbine derivative power plant integrated with a supplemental compressed air system, said power plant including a combustion turbine assembly having at least one compressor, at least one expansion turbine operatively associated with said at least one compressor, with at least one combustor feeding said at least one expansion turbine, and at least one electric generator coupled with one of said at least one expansion turbine and said at least one compressor, said at least one compressor communicating with an inlet to said at least one combustor via flow path structure, the method including:

upgrading a capacity of the electric generator;

providing a supplemental compressed air system comprising:

a compressor structure sized to provide a certain supplemental airflow;

at least one electric motor to drive the compressor structure;

at least one intercooler associated with the compressor structure;

an aftercooler downstream of said compressor structure;

a saturator downstream of said aftercooler;

a water heater in communication with said saturator to provide heated water to said saturator to preheat compressed air directed to said saturator; and a recuperator in communication with an outlet of said saturator to further heat preheated saturated compressed air exiting said saturator, integrating said combustion turbine assembly and said supplemental compressed air system by providing:

connection structure permitting communication between an outlet of said aftercooler an inlet to said saturator and permitting communication between an outlet of said recuperator and an inlet to said at least one combustor, and valving to control flow through said connection structure, the integration ensuring selective provision of two modes of operation: a) a combustion turbine mode of operation, and b) an air augmentation mode of operation providing a power higher than that provided by said combustion turbine mode of operation, by directing supplemental compressed air flow from said supplemental compressor structure to said saturator, to said recuperator and then to said at least one combustor feeding said at least one expansion turbine.

10. The method according to claim 9, wherein during said combustion turbine mode of operation, said valving is closed so as to define a flow path from said at least one compressor through said flow path structure to said at least one combustor.

11. The method according to claim 9, wherein during said air augmentation mode of operation, said valving is open so as to define a gas and air flow path where supplemental compressed air from said supplemental compressor structure moves through said connection structure and to saturator and then to said recuperator and mixes with the air from an outlet said at least one compressor and moves to said at least one combustor feeding with products of combustion said at least one expansion turbine, such that said at least one expansion turbine produces maximum allowable power, thus increasing electric power by said electric generator to an electric grid.

12. The method according to claim 9, wherein said certain supplemental airflow is about 35 lbs/sec.

* * * * *